United States Patent
Hara et al.

(10) Patent No.: US 7,100,290 B2
(45) Date of Patent: Sep. 5, 2006

(54) METHOD OF MEASURING UNILATERAL FLOW RATE OF VEHICLES

(75) Inventors: Kiyonobu Hara, Tochigi-ken (JP); Sumio Noguchi, Tochigi-ken (JP); Kenichiro Kurai, Tochigi-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/469,708

(22) PCT Filed: Mar. 15, 2002

(86) PCT No.: PCT/JP02/02485

§ 371 (c)(1),
(2), (4) Date: Feb. 3, 2004

(87) PCT Pub. No.: WO02/077601

PCT Pub. Date: Oct. 3, 2002

(65) Prior Publication Data

US 2004/0134080 A1    Jul. 15, 2004

(30) Foreign Application Priority Data

Mar. 15, 2001    (JP) .............................. 2001-74517

(51) Int. Cl.
*G01B 5/24* (2006.01)
*G01L 3/26* (2006.01)

(52) U.S. Cl. .............................. 33/203.13; 33/203.12; 73/117

(58) Field of Classification Search ............. 33/203.13, 33/203.12, 203.14; 73/117, 123, 124, 125, 73/126, 127, 670
See application file for complete search history.

(56) References Cited

U.S. PATENT DOCUMENTS

| | | | | |
|---|---|---|---|---|
| 3,871,106 A | * | 3/1975 | Hegenbart | 33/203.13 |
| 4,158,961 A | * | 6/1979 | Ben-David | 73/117 |
| 4,880,072 A | | 11/1989 | Sakamoto et al. | |
| 4,885,846 A | * | 12/1989 | Nemeth et al. | 33/203.13 |
| 5,040,303 A | * | 8/1991 | Koerner | 33/286 |
| 5,115,678 A | * | 5/1992 | Ozaki et al. | 73/117 |
| 5,150,515 A | * | 9/1992 | Merrill et al. | 33/203.12 |
| 5,297,344 A | * | 3/1994 | Fukuda et al. | 33/203.13 |
| 5,402,676 A | * | 4/1995 | Shibayama et al. | 73/118.1 |
| 5,513,438 A | * | 5/1996 | Emmons | 33/203.12 |
| 6,134,509 A | * | 10/2000 | Furusho et al. | 702/167 |
| 6,256,894 B1 | * | 7/2001 | Naruse et al. | 33/203.12 |
| 6,257,054 B1 | * | 7/2001 | Rostkowski et al. | 73/117 |

(Continued)

FOREIGN PATENT DOCUMENTS

EP    0 278 439    2/1988

(Continued)

*Primary Examiner*—Diego Gutierrez
*Assistant Examiner*—Amy R. Cohen
(74) *Attorney, Agent, or Firm*—Arent Fox PLLC

(57) ABSTRACT

The invention makes it possible to measure a lateral displacement amount of a vehicle accurately in a short time on a bench testing machine without damaging a vehicle body and tires.

Respective rollers 1F, 1R on which respective wheels WF, WR of the vehicle A are placed respectively are made movable in a lateral direction. In a state in which the respective wheels WF, WR are rotating at a predetermined speed, lateral forces (cornering forces) acting on the respective rollers 1F, 1R are detected by respective detectors 3. Then, a yaw angle speed when the vehicle A is brought into a state of steady circular turning is calculated based on the lateral forces acting on the respective rollers 1F, 1R and the lateral displacement amount is calculated from the yaw angle speed.

1 Claim, 2 Drawing Sheets

U.S. PATENT DOCUMENTS

| | | | |
|---|---|---|---|
| 6,327,785 B1* | 12/2001 | Dale et al. | 33/288 |
| 6,546,635 B1* | 4/2003 | Gerdes | 33/203.13 |
| 6,564,461 B1* | 5/2003 | Naruse | 33/203 |
| 6,657,711 B1* | 12/2003 | Kitagawa et al. | 356/155 |
| 6,739,185 B1* | 5/2004 | Schoeninger | 73/146 |
| 2002/0178594 A1* | 12/2002 | Hirano et al. | 33/203.13 |
| 2005/0132587 A1* | 6/2005 | Larson et al. | 33/203.12 |

FOREIGN PATENT DOCUMENTS

| | | |
|---|---|---|
| JP | 63-201550 | 8/1988 |
| JP | 2-36332 | 2/1990 |
| JP | 6-331505 | 12/1994 |
| JP | 8-43263 | 2/1996 |
| JP | 10-221215 | 8/1998 |

* cited by examiner

METHOD OF MEASURING UNILATERAL FLOW RATE OF VEHICLES

CROSS-REFERENCE TO RELATED APPLICATION

This application is a National Stage entry of International Application No. PCT1JP02102485, the entire specification claims and drawings of which are incorporated herewith by reference.

TECHNICAL FIELD

The present invention relates to a method of measuring a lateral displacement amount of a vehicle (a value indicating a distance by which the vehicle is displaced rightward or leftward while traveling a reference distance) generated due to dispersions in assembly accuracy of a vehicle body, accuracy of wheel alignment, and the like when the vehicle travels with its steering wheel in a straight-ahead state.

BACKGROUND ART

Conventionally, there is a known method as disclosed in Japanese Patent Application Laid-open No. 6-331505 in which a bench testing machine having rollers for front wheels and rollers for rear wheels is used and the front and rear wheels of a vehicle are rotated on the corresponding rollers to measure a lateral displacement amount of the vehicle. In this method, the bench testing machine is provided with adjusting wheels for coming in contact with the respective wheels of the vehicle from a lateral direction and load cells each for detecting a force of each wheel pressing back each wheel in a lateral direction. An input load of the load cell when the wheel is rotated on the roller is converted into the lateral displacement amount based on data showing correlation between a load cell input load and the amount of lateral displacement and collected by measuring the input load of a measuring apparatus and by measuring the lateral displacement amount in an actual traveling test on a common vehicle in advance and an evaluation of lateral displacement on a pass/fail basis is conducted based on whether the lateral displacement amount is equal to or less than a reference value.

Conventionally, there is also a known method as disclosed in Japanese Patent Application Laid-open No. 8-43263 in which a bench testing machine is provided with a swinging frame for moving back and forth in a lateral direction toward side sills of a vehicle and for swinging about a vertical axis, the swinging frame is mounted with a pair of measuring rollers in contact with front and rear two positions of the side sills of the vehicle, and a lateral movement amount and a swinging angle of the swinging frame are detected in a rotating state of wheels and are respectively compared with each reference value to thereby conduct an evaluation of lateral displacement on a pass/fail basis.

In the former prior art, however, the data showing the correlation between the load cell input load and the lateral displacement amount need be obtained for each vehicle type, which require much time and labor. Moreover, because the data are obtained by bringing the adjusting wheels into contact with side faces of a tire of the respective wheels, data values are affected by projections and depressions on the side faces, true data cannot be obtained, and reliability decreases. Furthermore, contact marks may be left on the tires by the adjusting wheels which have come in contact with the tires.

In the latter prior art, translational motion of the vehicle in the lateral direction is detected as the lateral movement amount of the swinging frame and yawing motion of the vehicle is detected as the swinging angle of the swinging frame. Even if the vehicle is displaced laterally, much time is required for the vehicle to move laterally or yaw to such a degree as to be detected and it is difficult to measure in a short time. Moreover, because the measuring rollers are brought into contact with the side sills, the side sills may be damaged.

With the above points in view, it is an object of the present invention to provide a method of measuring the lateral displacement amount of the vehicle accurately in a short time without damaging a vehicle body and tires by using a bench testing machine.

DISCLOSURE OF INVENTION

To achieve the above object, according to the present invention, there is provided a method of measuring a lateral displacement amount of a vehicle by using a bench testing machine including rollers for front wheels and rollers for rear wheels and rotating the front and rear wheels of the vehicle on the corresponding rollers, the method including the steps of: making the respective rollers movable in a lateral direction and detecting lateral forces acting on the respective rollers in a state in which the respective wheels are rotating at a predetermined speed; calculating a yaw angle speed of the vehicle when the vehicle is brought into a state of steady circular turning based on the detected lateral forces on the rollers; and calculating the lateral displacement amount of the vehicle based on the calculated yaw angle speed.

Movement of the vehicle when the vehicle is displaced in a lateral direction is steady circular turning with an extremely large radius. Here, the lateral forces acting on the respective rollers are equal to cornering forces of the respective wheels. The yaw angle speed can be determined by substituting detected values of the lateral forces on the rollers as the cornering forces in an equation of motion at a time of the steady circular turning. The lateral displacement amount can be calculated based on the yaw angle speed.

Therefore, there is no need to conduct an actual traveling test on each vehicle type and the lateral displacement amount can be calculated even if the vehicle does not move laterally or yaw to such a degree as to be detectable. Therefore, it is possible to shorten a measuring time. Moreover, because measuring members need not be brought into contact with a vehicle body or tires, damage to the vehicle body and tires can be prevented, influence of projections and depressions on side faces of a tire can be avoided, and the lateral displacement amount can be calculated with accuracy.

BEST MODE FOR CARRYING OUT THE INVENTION

Figure 1:
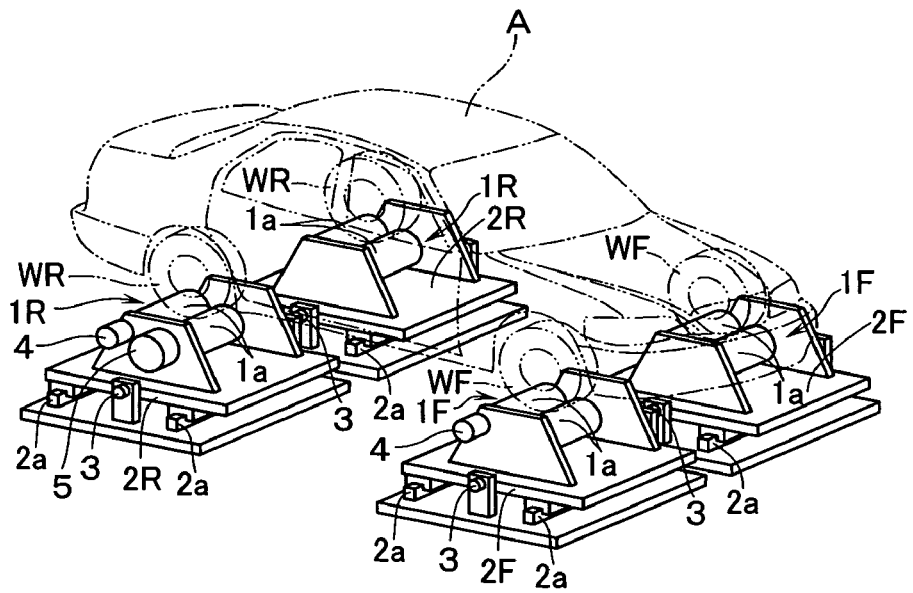
FIG. 1 is a perspective view of a bench testing machine used for carrying out a method of the present invention.

FIG. 1 shows a bench testing machine including a pair of right and left front wheel rollers 1F, 1F on which right and left front wheels WF of a vehicle A are placed respectively and a pair of right and left rear wheel rollers 1R, 1R on which right and left rear wheels WR of the vehicle A are placed respectively. The respective front wheel and rear wheel rollers 1F and 1R are respectively formed of front and rear two divided rollers 1a, 1a axially supported on respective roller support frames 2F, 2R. The respective roller support frames 2F, 2R are supported to be movable in a lateral direction along guide rails 2a. Detectors 3 such as load cells for detecting lateral forces acting on the respective rollers 1F and 1R through the respective roller support frames 2F and 2R are provided. Furthermore, speed meters 4 for detecting rotational speeds of the respective rollers 1F, 1R, a motor 5 for driving the roller 1R for the rear wheels WR which are follower wheels, and a computer (not shown) to which signals from the detector 3 and the speed meter 4 are input are provided.

Figure 2:
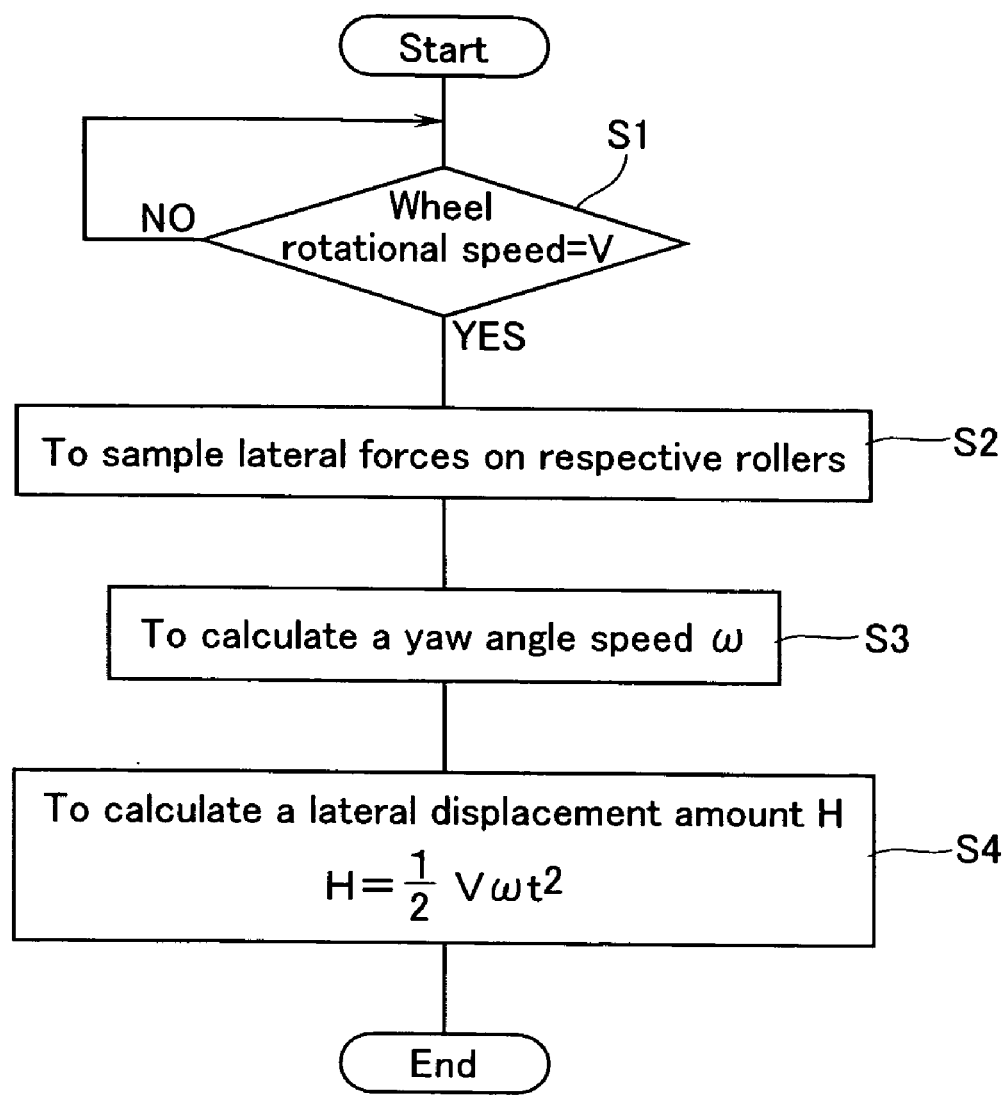
FIG. 2 is a flow chart showing a procedure for measuring a lateral displacement amount.

In measuring a lateral displacement amount of the vehicle A, the respective wheels WF, WR of the vehicle A are placed on the respectively corresponding rollers 1F, 1R, the vehicle A is restrained by restraining means (not shown) so as not to be displaced laterally, while a steering wheel of the vehicle A is held in a straight-ahead position, the front wheels WF which are driving wheels are rotated by a vehicle-mounted engine, and the rear wheels WR which are the follower wheels are rotated at the same speed as the front wheels WF by the motor 5 through the rollers 1R. Then, as shown in FIG. 2, immediately after the rotational speeds of the front wheels WF and the rear wheels WR have reached a predetermined speed V (e.g., 40 km/h in terms of a vehicle speed) (S1), the lateral forces acting on the respective rollers 1F, 1R are sampled by the respective detectors 3 for a predetermined period (e.g., 100 msec) (S2).

Figure 3:
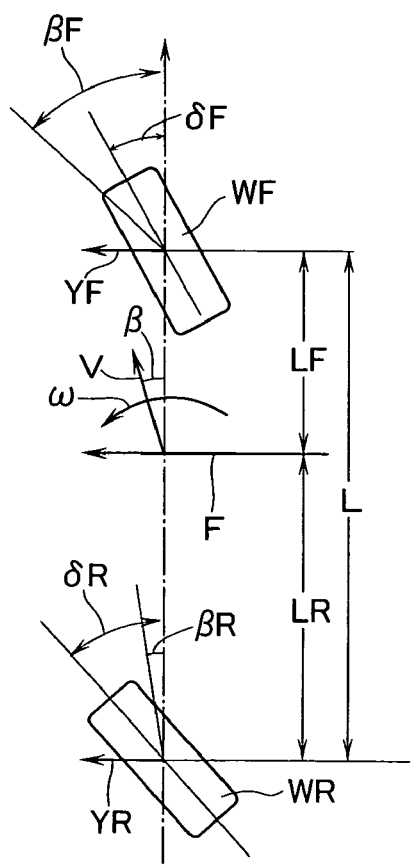
FIG. 3 is a diagram showing a model of motion of a vehicle.

Here, the lateral displacement of the vehicle A is a resultant movement of lateral translational motion and yawing motion. FIG. 3 shows a simplified two-wheel motion model of a four-wheel vehicle. In the drawing, reference numerals YF and YR designate cornering forces of the front wheels WF and the rear wheels WR respectively, βF and βR designate side slip angles of the front wheels WF and the rear wheels WR respectively, δF and δR designate toe-in angles of the front wheels WF and the rear wheels WR respectively, β designates a side slip angle of a center of gravity of the vehicle A, ω designates a yaw angle speed of the center of gravity of the vehicle A, F designates a force of lateral movement of the center of gravity of the vehicle A, L designates a distance between the front wheels WF and the rear wheels WR, LF designates a distance between the center of gravity of the vehicle A and the front wheels WF, and LR designates a distance between the center of gravity of the vehicle A and the rear wheels WR.

If the total cornering force of the right and left front wheels WF is 2 YF and the total cornering force of the right and left rear wheels WR is 2 YR, an equation of the translational motion of the four-wheel vehicle is $$F = M \cdot V \left( \frac{d\beta}{dt} + \omega \right) = 2(YF + YR) \tag{1}$$

, where M is a vehicle weight. An equation of the yawing motion is $$I \frac{d\omega}{dt} = 2(LF \cdot YF - LR \cdot YR) \tag{2}$$

, where I is moment of inertia around the center of gravity of the vehicle A. YF and YR are $$YF = -KF \cdot \beta F = -KF \left( \beta + \frac{LF \cdot \omega}{V} - \delta F \right) \tag{3}$$

$$YR = -KR \cdot \beta R = -KR \left( \beta - \frac{LR \cdot \omega}{V} - \delta R \right) \tag{4}$$

, where KF and KR are tire cornering powers (constant values inherent in tires and determined by rim diameters, widths, and air pressures of the tires) of the front wheels WF and the rear wheels WR respectively. In an initial state of the lateral displacement, ω=β=0 and $$YF = KF \cdot \delta F \rightarrow \delta F = YF/KF \tag{3'}$$

$$YR = KR \cdot \delta R \rightarrow \delta R = YR/KR \tag{4'}$$

Substituting the equations (3) and (4) in the equations (1) and (2) and simplifying them yield $$M \cdot V \frac{d\beta}{dt} + 2(KF + KR)\beta + \left\{ M \cdot V + \frac{2(KF \cdot LF - KR \cdot LR)}{V} \right\} \omega = \tag{5}$$
$$2(KF \cdot \delta F + KR \cdot \delta R)$$

$$2\beta(KF \cdot LF - KR \cdot LR) + \frac{2\omega}{V}(KF \cdot LF^2 + KR \cdot LR^2) + I\frac{d\omega}{dt} = \tag{6}$$
$$2(KF \cdot LF \cdot \delta F - KR \cdot LR \cdot \delta R)$$

If the vehicle A performs steady circular turning, dω/dt=0, dβ/dt=0. Therefore, the equations (5) and (6) are $$2(KF + KR)\beta + \left\{ M \cdot V + \frac{2(KF \cdot LF - KR \cdot LR)}{V} \right\} \omega = \tag{5'}$$
$$2(KF \cdot \delta F + KR \cdot \delta R)$$

$$2(KF \cdot LF - KR \cdot LR) + \frac{2\omega}{V}(KF \cdot LF^2 + KR \cdot LR^2) = \tag{6'}$$
$$2(KF \cdot LF \cdot \delta F - KR \cdot LR \cdot \delta R)$$

Then, from the equations (5') and (6'), ω is determined as follows.

$$\omega = V(\delta F - \delta R)/(1-K)L \tag{7}$$

$$\left( K = 1 - \frac{M}{2L^2} \cdot \frac{KF \cdot LF - KR \cdot LR}{KF \cdot KR} V^2 \right)$$

Substituting δF, δR of the equations (3') and (4') in δF, δR of the equation (7) yields $$\omega = V \left( \frac{YF}{KF} - \frac{YR}{KR} \right) / (1-K)L \tag{7'}$$

Here, if the lateral force acting on the roller 1F for the right front wheel is YFR, the lateral force acting on the roller 1F for the left front wheel is YFL, the lateral force acting on the roller 1R for the right rear wheel is YRR, and the lateral force acting on the roller 1R for the left rear wheel is YRL, $$YF=(YFR+YFL)/2 \quad (8)$$

$$YR=(YRR+YRL)/2 \quad (9)$$

Thus, by substituting the lateral forces of the respective rollers 1F and 1R detected by the respective detectors 3 in the equations (8) and (9) to calculate YF and YR respectively and substituting YF and YR in the equation (7'), the yaw angle speed $\omega$ in a state in which the vehicle A performs steady circular turning can be calculated.

After the yaw angle speed $\omega$ is calculated from detected values of the lateral forces of the respective rollers 1F and 1R in the above manner (S3), the lateral displacement amount H of the vehicle A is calculated based on the yaw angle speed $\omega$ (S4). Here, because the lateral displacement amount H is a distance of translational movement in the lateral direction and a translational acceleration in the lateral direction of the vehicle A is V(d$\beta$/dt+$\omega$), H can be shown as:

$$H = \int\int V\left(\frac{d\beta}{dt}+\omega\right)dt^2 \quad (10)$$

In the steady circular turning, d$\beta$/dt=0 and the equation (10) becomes as follows:

$$H = \int\int V\omega dt^2 = \int (Ho + V\omega t)dt = Ho + Vot + \frac{1}{2}V\omega t^2 \quad (11)$$

$H_0$ and $V_0$ are initial values of the lateral translational distance and the lateral translational speed respectively.

Because of $H_0=V_0=0$ in the steady circular turning, H can be modified as:

$$H = \frac{1}{2}V\omega t^2 \quad (12)$$

If the lateral displacement amount H is used as a value indicating a distance by which the vehicle is displaced in the lateral direction while traveling 100 m, t must be:

$$t=100(m)/V(m/\text{sec})$$

and the lateral displacement amount H (m/100 m) can be determined by substituting t in the equation (12).

As is apparent from the above description, according to the invention, the lateral displacement amount of the vehicle can be measured accurately in a short time on the bench testing machine without damaging the vehicle body and the tires to increase efficiency.

The invention claimed is:

1. A method of measuring a lateral displacement amount of a vehicle by using a bench testing machine including one pair of rollers for each front wheel and one pair of rollers for each rear wheel and rotating the front and rear wheels of the vehicle on the corresponding rollers, the method including the steps of:
    making the respective rollers movable in a lateral direction and detecting lateral forces acting on the respective rollers in a state in which the respective wheels are rotating at a predetermined speed;
    calculating a yaw angle speed of the vehicle when the vehicle is brought into a state of steady circular turning based on the detected lateral forces on the rollers; and
    calculating the lateral displacement amount of the vehicle based on the calculated yaw angle speed.

* * * * *